(12) United States Patent
Chapman et al.

(10) Patent No.: US 12,423,501 B1
(45) Date of Patent: Sep. 23, 2025

(54) SKEWING LEVEL LIMITED CLOCK TREE

(71) Applicant: Cadence Design Systems, Inc., San Jose, CA (US)

(72) Inventors: Andrew Mark Chapman, Milton (GB); Charles Jay Alpert, Cedar Park, TX (US); Andrew Hall, Cambridge (GB)

(73) Assignee: Cadence Design Systems, Inc., San Jose, CA (US)

( * ) Notice: Subject to any disclaimer, the term of this patent is extended or adjusted under 35 U.S.C. 154(b) by 565 days.

(21) Appl. No.: 17/989,568

(22) Filed: Nov. 17, 2022

(51) Int. Cl.
| | |
|---|---|
| *G06F 30/396* | (2020.01) |
| *G06F 30/20* | (2020.01) |
| *G06F 30/327* | (2020.01) |
| *G06F 30/3312* | (2020.01) |
| *G06F 30/3315* | (2020.01) |
| *G06F 30/337* | (2020.01) |
| *G06F 30/367* | (2020.01) |
| *G06F 30/373* | (2020.01) |
| *G06F 117/10* | (2020.01) |

(52) U.S. Cl.
CPC .......... *G06F 30/396* (2020.01); *G06F 30/327* (2020.01); *G06F 30/20* (2020.01); *G06F 30/3312* (2020.01); *G06F 30/3315* (2020.01); *G06F 30/337* (2020.01); *G06F 30/367* (2020.01); *G06F 30/373* (2020.01); *G06F 2117/10* (2020.01)

(58) Field of Classification Search
CPC ...... G06F 30/396; G06F 30/327; G06F 30/20; G06F 30/3312; G06F 30/3315; G06F 30/337; G06F 30/367; G06F 30/373; G06F 2117/10

USPC ................... 716/134, 113, 106, 136; 703/16
See application file for complete search history.

(56) References Cited

U.S. PATENT DOCUMENTS

| | | | | |
|---|---|---|---|---|
| 6,698,006 | B1 * | 2/2004 | Srinivasan | G06F 30/396 |
| | | | | 716/122 |
| 6,711,716 | B1 * | 3/2004 | Mueller | G06F 30/30 |
| | | | | 326/38 |

(Continued)

OTHER PUBLICATIONS

Li et al., Chinese Patent Document No. CN-111881646-A, published Nov. 3, 2020, 4 pages including abstract, claims and 1 drawing. (Year: 2020).*

*Primary Examiner* — Phallaka Kik
(74) *Attorney, Agent, or Firm* — Schwegman Lundberg & Woessner, P.A.

(57) ABSTRACT

Methods and systems for performing post clock tree synthesis of a clock tree. The methods and systems access, from memory, a circuit design comprising a clock tree that interconnects a clock source to a plurality of clock sinks, each clock sink in the plurality of clock sinks having an associated target insertion delay adjustment, the clock tree comprising a restriction on a quantity of levels of components for respectively adding delay to the clock source. The methods and systems identify an individual target insertion delay adjustment associated with an individual clock sink of the plurality of clock sinks and compare the individual target insertion delay adjustment to a threshold value. The methods and systems selectively remove the restriction on the quantity of levels of components to provide the individual target insertion delay adjustment based on comparing the individual target insertion delay adjustment to the threshold value.

20 Claims, 8 Drawing Sheets

(56) References Cited

U.S. PATENT DOCUMENTS

| | | | | |
|---|---|---|---|---|
| 7,178,124 B1* | 2/2007 | Makarov | ............... | G06F 30/39 |
| | | | | 716/124 |
| 2003/0011413 A1* | 1/2003 | Masleid | ............... | G06F 1/10 |
| | | | | 327/165 |
| 2003/0080782 A1* | 5/2003 | Bailey | ............... | H03K 19/0016 |
| | | | | 257/E29.28 |
| 2009/0019407 A1* | 1/2009 | Matsui | ............... | G06F 1/10 |
| | | | | 716/106 |
| 2012/0110538 A1* | 5/2012 | Shih | ............... | G06F 30/394 |
| | | | | 716/129 |
| 2014/0047402 A1* | 2/2014 | Terayama | ............... | G06F 30/327 |
| | | | | 716/108 |
| 2014/0289690 A1* | 9/2014 | Chopra | ............... | G06F 30/396 |
| | | | | 716/113 |
| 2014/0289694 A1* | 9/2014 | Ma | ............... | G06F 30/3312 |
| | | | | 716/129 |
| 2014/0298283 A1* | 10/2014 | Chen | ............... | G06F 30/396 |
| | | | | 716/114 |

\* cited by examiner

SKEWING LEVEL LIMITED CLOCK TREE

TECHNICAL FIELD

The present disclosure generally relates to the technical field of circuit design. In particular, the present disclosure addresses systems and methods for performing post-clock tree synthesis (CTS) modification using insertion delay and skew targets of the clock tree.

BACKGROUND

An integrated circuit (IC) layout specifies portions of various components of an IC. An IC typically includes a large number of registers, latches, flip-flops and/or other types of clocked devices, which are referred to herein generally as "clock sinks," ("sinks"). These clock sinks must be clocked by one or more clock signals in the IC, and the IC must include one or more clock trees for distributing a clock signal from a clock source to all of the clock sinks to be clocked by the clock signal. A clock tree distributes a clock signal from its root node to a set of clock sinks within an IC through a branching network of drivers (e.g., buffers or inverters). A single driver distributes the clock signal to a grouping of other drivers and/or clock sinks. Connectivity between a driver and its fanout to other drivers or sinks is represented by a "clock net" and will be physically implemented by routed conductive traces, which may be referred to simply as "routes" herein. CTS is the process of structuring a clock tree to provide the clock signal from the root to all the clock sinks so that the clock signal ideally arrives at, or is received by, all clock sinks at the same time.

BRIEF DESCRIPTION OF THE DRAWINGS

To easily identify the discussion of any particular element or act, the most significant digit or digits in a reference number refer to the figure number in which that element is first introduced.

Various ones of the appended drawings merely illustrate example embodiments of the present inventive subject matter and cannot be considered as limiting its scope.

DETAILED DESCRIPTION

Figure 1:
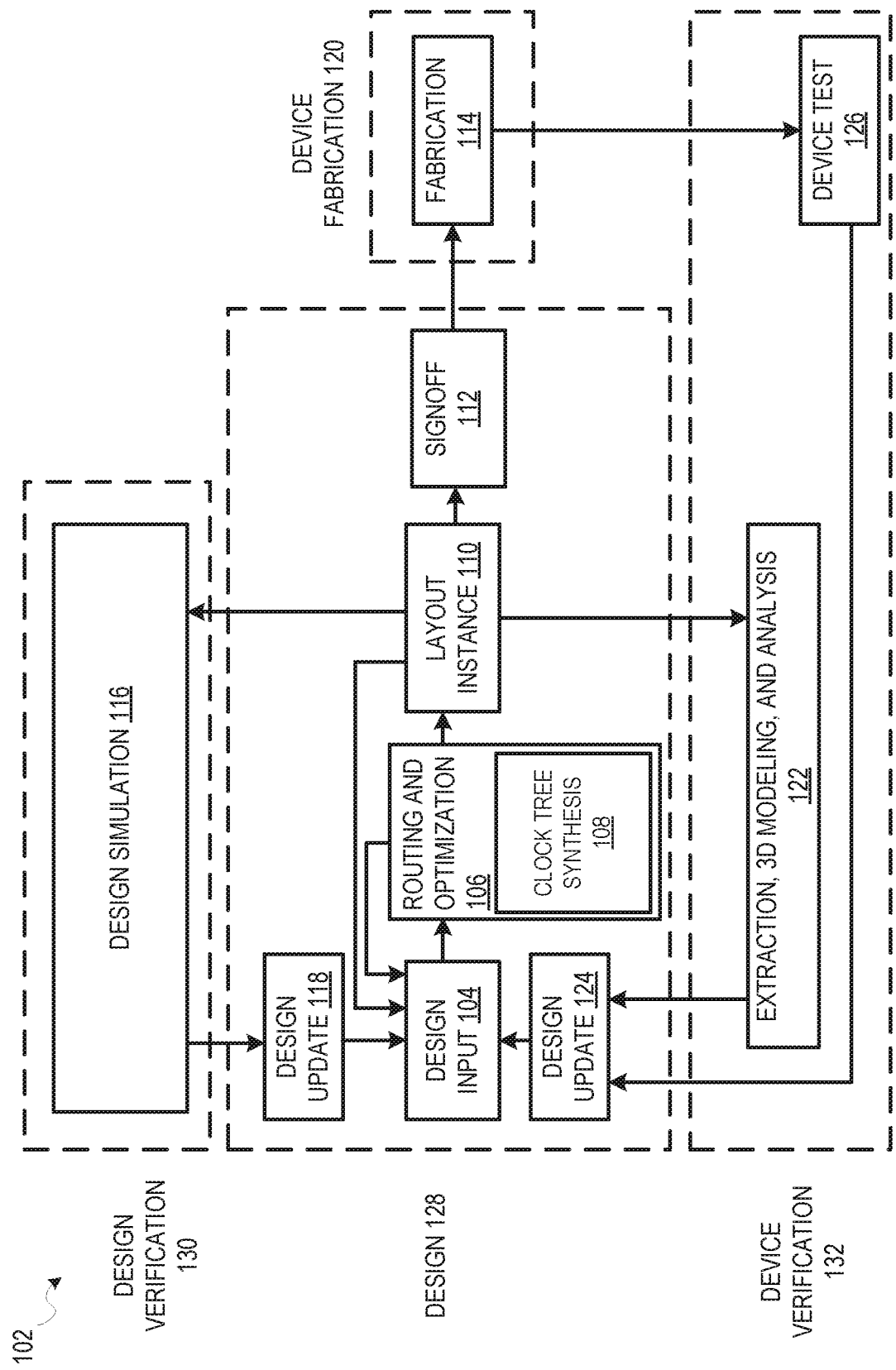
FIG. 1 illustrates an example design process flow that includes post-CTS clock tree modifications to a clock tree (which can be part of clock tree synthesis 108), in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Electronic design automation (EDA) software systems commonly perform CTS. Conventional approaches to CTS typically include a labor-intensive process that generates a mapping of clock signals to each clock sink within a design. Generally, buffers and inverters are inserted along a clock path to achieve required transition times (e.g., slew) of the clock signal propagating through the clock tree. The clock tree is also structured to meet required insertion delay and skew for the clock sinks. The meaning of the terms slew, insertion delay, and skew of clock sinks in a clock tree are discussed in more detail below. For ICs, a clock tree structure typically consumes 15-30% of total power consumption, and may consume up to approximately half of the total power consumption of the IC. Improved clock tree structures may reduce power consumption in the clock tree and thereby help reduce the total power consumption of the IC.

CTS is the process of structuring a clock tree to provide the clock signal from the root to all the clock sinks so that the clock signal ideally arrives at or is received by all clock sinks at the same time. The clock signal is said to be a propagated clock signal as the clock signal is communicated from or "propagates" from the root through drivers and conductive traces to the clock sinks. Drivers are included in the clock tree, as required, to ensure the propagated clock signal meets required transition time or slew rate specifications for the clock tree. The clock tree must be structured or synthesized so that the propagated clock signal meets the required slew rate specifications as well as required insertion delay and skew for all the clock sinks in the clock tree. After a clock tree has been synthesized, which will be referred to herein as "post-CTS", modifying the clock tree is a difficult and time-consuming process. While this is true, the need arises regularly to make post-CTS clock tree modifications to the clock tree as designers of an IC including the clock tree refine their circuit designs and test the operation of the IC. There is accordingly a need for improved techniques for making post-CTS clock tree modifications to a clock tree.

Existing techniques in EDA software systems for restructuring or modifying a clock tree after CTS have been limited up to now. As the CTS generates a clock tree in a holistic manner, any restructuring of one clock sink in the clock tree after the generation can impact characteristics of the clock signal applied to other clock sinks in the clock tree. Some modifications to the clock tree post-CTS may be implemented through changing the sizing of buffers to adjust or modify slew or transition times of the propagating clock signal. This approach of adding, removing, or resizing of buffers is impracticable to implement, however, to adjust numerous targeted individual clock sinks throughout the clock tree. This is true because of the consequences of adjustments to fix one parameter or design rule of the clock tree may cause other design rules to be violated. For example, a design rule violation (DRV), such as a slew rate or transition time violation, of a given clock sink in the clock tree may be fixed, for example, by increasing a size of a buffer driving the clock signal applied to the clock sink. A larger buffer will reduce the transition time of the applied clock signal, but this will also reduce the insertion delay of the clock sink, which may undesirably increase the skew of this clock sink. Another example is adding a buffer to fix a slew violation of the clock signal being applied to a given clock sink may increase the insertion delay as well as the skew of the clock sink.

EDA software systems have conventionally not allowed for restructuring or modifications to a post-CTS clock tree. More recently, EDA software systems have implemented techniques for restructuring or modifying a post-CTS clock tree, without once again performing clock tree synthesis, based on designer or user supplied targets. Ideally, the EDA software system would, without once again performing clock tree synthesis and without requiring designer input, analyze the synthesized clock tree and automatically modify the clock tree to eliminate violations of specified design parameters for the clock tree. In addition, ideally these post-CTS clock tree modifications would minimize or reduce the number of post-CTS physical modifications to the clock tree. This is true because any physical modifications to the post-CTS clock tree, which are physical changes to the structure of the clock tree, will cause further unwanted changes to parameters of the clock tree. For example, if the clock tree is restructured by moving a location of a given clock sink (CS) to reduce the insertion delay (ID) of this clock sink, unwanted variations to the parameters of neighboring clock sinks will invariable result due to this restructuring. The restructuring may, for example, undesirably increase the IDs of some of the neighboring CSs. Similarly, adding more buffers to the tree to introduce or change the ID of a given set of CSs can have the undesirable effect of increased power consumption, design complexity, and resource consumption.

Embodiments of the present disclosure are directed to EDA software systems that implement techniques for automatically modifying a post-CTS clock tree to eliminate violations of target insertion delays of certain CSs and skew design parameters for the clock tree. The disclosed techniques also reduce the number of modifications to the post-CTS clock tree that are necessary for the post-CTS clock tree to satisfy target insertion delay adjustments and skew parameters for the clock tree. Briefly, in some embodiments, a clock tree with a restricted quantity of levels of buffers (each level adding additional delay or skew to the clock) is modified to relax the restriction on the quantity of levels for certain CSs on the basis of the amount of target insertion delay adjustment that is needed by the certain CSs. If the target insertion delay adjustment that is needed transgresses a specified threshold, one or more additional levels can be added to the clock tree only for a branch that connects to those certain CSs. If the target insertion delay adjustment that is needed fails to transgress the specified threshold, the restriction on the quantity of levels remains in place and additional, reduced or modified delay is provided to satisfy the target insertion delay adjustment of the certain CSs by adjusting a size or type of the buffers in the clock tree levels and/or by reducing/increasing a path distance between the certain CSs and a given level of the clock tree.

In this way, embodiments of the present disclosure identify clock sinks in the post-CTS clock tree that must be adjusted or modified in a way that reduces the number of post-CTS modifications required for the clock tree to satisfy the specified insertion delay or skew parameters, as will be described in more detail below. Embodiments of the present disclosure allow for post-CTS modifications to the clock tree while eliminating the need for designer input relating to these modification as well as eliminating the need to perform the time- and resource-intensive process of again performing CTS to generate a new clock tree.

In accordance with some embodiments of the present disclosure, a system includes one or more processors and a memory storing instructions that, when executed by the one or more processors, cause the system to perform operations including accessing a circuit design stored in the memory, such as an integrated circuit design. The circuit design includes a clock tree that interconnects a clock source to a plurality of clock sinks, each clock sink in the plurality of clock sinks having an associated target insertion delay adjustment. The clock tree includes a restriction on a quantity of levels of components for respectively adding delay to the clock source. The system identifies an individual target insertion delay adjustment associated with an individual clock sink of the plurality of clock sinks and compares the individual target insertion delay adjustment to a threshold value. The system selectively removes the restriction on the quantity of levels of components to provide the individual target insertion delay adjustment based on comparing the individual target insertion delay adjustment to the threshold value and modifies at least a portion of the clock tree based on application of the restriction after the selectively removing.

In some examples, the system determines that the individual target insertion delay adjustment transgresses the threshold value. In response to determining that the individual target insertion delay adjustment transgresses the threshold value, the system adds one or more levels to the clock tree to provide a path from the clock source to the individual clock sink that includes a greater quantity of levels of components than the quantity of levels associated with the restriction. In some cases, the individual target insertion delay adjustment is a first insertion delay adjustment (e.g., associated with a first clock skew) and the individual clock sink is a first clock sink. The system generates or implements the first insertion delay adjustment by routing the clock source to the first clock sink through a first quantity of components and generates a second insertion delay adjustment for a second clock sink of the plurality of clock sinks by routing the clock source to the second clock sink through a second quantity of components. The second quantity of components can include fewer components than the first quantity of components.

In some examples, the threshold value can be any suitable value, such as ten or more picoseconds or a range between 5 picoseconds and 15 picoseconds.

In some examples, the system selectively adds more than one level to the clock tree if the individual target insertion delay adjustment transgresses the threshold value by more than a specified amount. In such cases, the threshold value can be defined as a first threshold value and the system determines that the individual target insertion delay adjustment transgresses a second threshold value that is greater than the first threshold value. In response to determining that the individual target insertion delay adjustment transgresses the second threshold value, the system adds more than one level to the clock tree to provide the path from the clock source to the individual clock sink.

In some examples, the system determines a maximum quantity of levels that can be added as the one or more levels. In some examples, the system determines that the individual target insertion delay adjustment fails to transgress the threshold value. In response to determining that the individual target insertion delay adjustment fails to transgress the threshold value, the system prevents adding one or more levels to the clock tree. In such cases, the system generates the individual target insertion delay adjustment by increasing a path length of a path from the clock source to the individual clock sink through the quantity of levels of components without modifying the quantity of levels. In some implementations, the system generates the individual target insertion delay adjustment by modifying a cell size of one or more components in the clock tree.

Reference will now be made in detail to specific example embodiments for carrying out the disclosed subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a diagram illustrating an example design process flow 102 of an EDA software system that includes post-CTS clock-tree restructuring in accordance with some embodiments. The terms "restructuring," "reformulating," and "modifying" are used interchangeable herein, and each should be understood to mean an update is being made to an existing clock tree, as described in more detail herein in the described embodiments. As shown in FIG. 1, the design process flow 102 includes a design phase 128, a device fabrication phase 120, a design verification phase 130, and a device verification phase 132. The design phase 128 involves an initial design input operation 104 where basic elements and functionality of a device, typically an IC, are determined. The initial design input operation 104 may also include revisions to elements or functionality of the device based on various analyses and optimization of a circuit design to be include in the device. This initial design input operation 104 operation is where block instances are used in the circuit design and any additional circuitry for the design around the blocks is selected. The initial strategy, tactics, and context for the device to be created are also generated in the initial design input operation 104, depending on the particular design algorithm being used.

In some embodiments, following an initial selection of design values in the design input operation 104, routing, timing analysis, and optimization are performed in a routing and optimization operation 106, along with any other automated design processes. While the design process flow 102 shows the routing and optimization operation 106 occurring prior to a layout instance operation 110, routing, timing analysis, and optimization in operation 106 may be performed at any time to verify operation of a circuit design. For instance, in various embodiments, timing analysis in a circuit design may be performed prior to routing of connections in the circuit design, after routing, during register transfer level (RTL) operations, or as part of a signoff operation 112, as will be understood by those skilled in the art.

In FIG. 1, the routing and optimization operation 106 includes a CTS operation 108, which may be performed in accordance with various embodiments described herein. The CTS operation 108 generates a clock tree that delivers a clock signal from a clock tree root node, which is a clock source of a circuit design, to a plurality of clock tree leaf nodes, which correspond to a plurality of clock sinks within the circuit design via one or more branches or levels of the clock tree. Before describing the CTS operation 108 in more detail, the general structures of clock trees and several key parameters of clock trees, namely insertion delay (ID) and skew (SK), will be described in more detail with reference to FIGS. 2 and 3.

Figure 2:
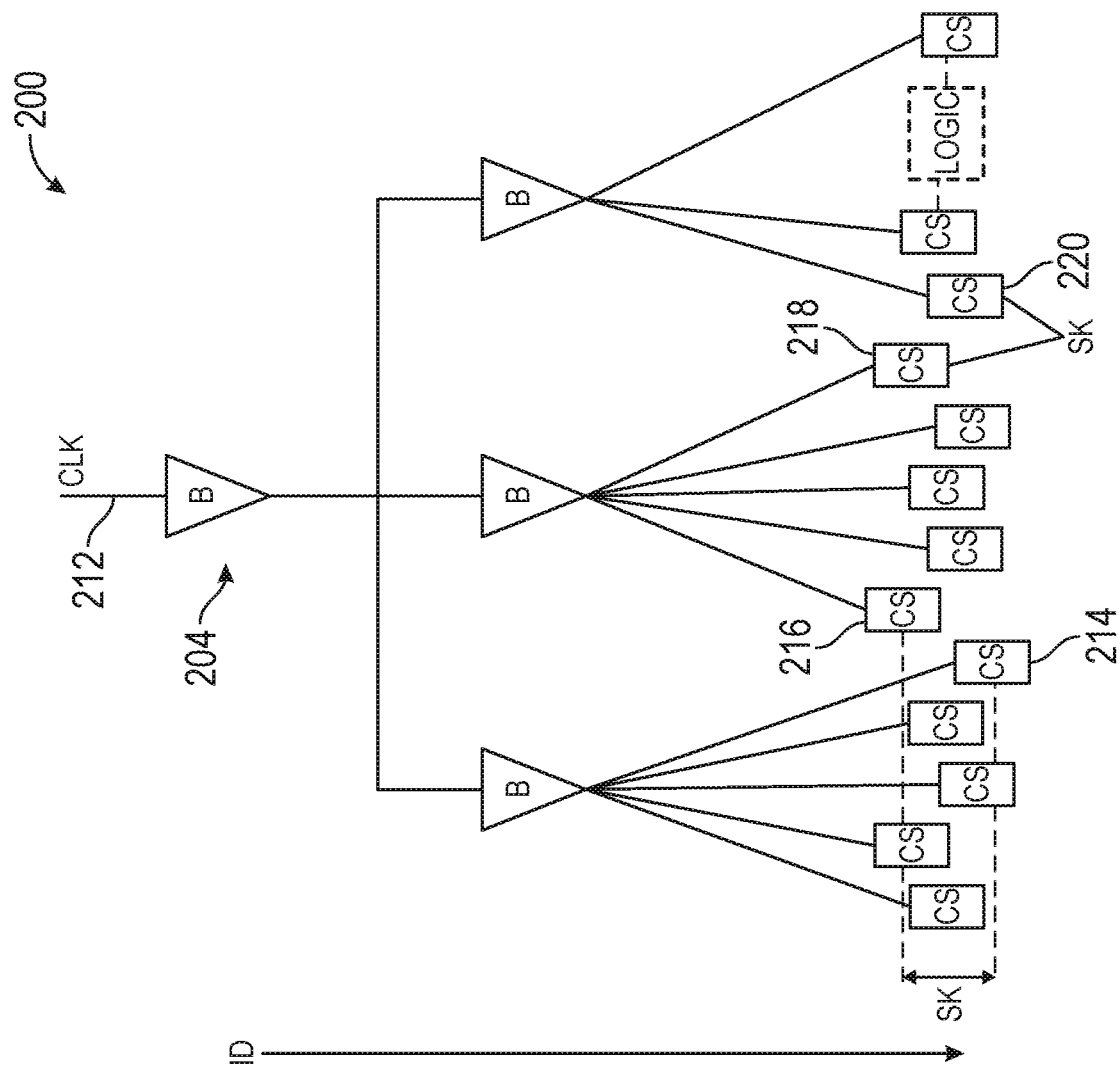
FIG. 2 illustrates examples of buffered and unbuffered clock trees to which post-CTS clock tree modifications may be applied, in accordance with some embodiments of the present disclosure.

FIG. 2 illustrates simplified examples of clock trees 200 along with the insertion delay and skew of clock sinks in these clock trees. More specifically, FIG. 2 illustrates a simplified version of a buffered clock tree 204. The buffered clock tree 204 includes buffers B (which can include any number of components or be implemented by any type of circuit component) for distributing the clock signal CLK to groups of clock sinks. There may be millions of clock sinks in the clock tree of an IC and thus these clock sinks are commonly divided into groups, each of these groups driven by appropriately sized buffers B in the buffered clock tree 204. The clock tree 204 of FIG. 2 also illustrates logic circuitry coupled between adjacent pairs of clock sinks in the respective clock tree. These blocks of logic circuitry, which are shown in dashed lines, are included merely to illustrate that the IC including the clock sinks of the clock tree also includes logic circuitry to provide the desired functionality of the IC. During operation of the IC, the clock sinks are clocked to, for example, clock data into and out of blocks of logic circuitry. Only a single clock sink is shown on either side of the blocks of logic circuitry to simplify the figure, but one skilled in the art will realize that large numbers of clock sinks would actually be utilized in clocking data into and out of blocks of logic circuitry.

The buffered clock tree 204 also illustrates the concept of skew among the plurality of clock sinks in the clock tree. Skew is the difference in insertion delay ID among the clock sinks, and thus indicates differences in time at which respective clock sinks receive the propagated clock signal. The clock sinks in the buffered clock tree 204 are shown to have varying insertion delays ID, as represented through the different vertical positions of the clock sinks 214 relative to a root node 212. The clock sinks 214 in the buffered clock tree 204 accordingly have non-zero skew, which will be the case in physically implemented clock trees. In some cases, the distance or wire length connecting each clock sink and a respective buffer B can also introduce some non-zero skew. Skews introduced by a length of a path (e.g., route) can change based on environmental conditions whereas skews introduced by respective buffers B are less prone to changes due to environmental condition. As such, it may be more desirable to generate skew using multiple buffers rather than relying on increasing/decreasing a path length from the root node 212 to the clock sink 214. However, adding more levels to the tree by interconnecting additional buffers between one of the buffers B and the root node 212 adds more design complexity, cost, and consumes more power. Because of this, some designs restrict or limit the total quantity of levels of buffers or components that can be added to the clock tree 204.

A global skew is represented by skew SK shown in the lower left of buffered clock tree 204, where global skew is the difference between a clock sink 214 having the longest insertion delay ID and a clock sink 216 having the shortest insertion delay. A relative skew between adjacent clock sinks, such as clock sinks 218 and 220, is also illustrated. Embodiments of methods and systems utilize the insertion delays ID and skew SK of clock sinks in the clock tree to implement post-CTS clock tree modifications in embodiments of the present disclosure, as will be described in more detail below. While the implementation of this disclosure is discussed with respect to using buffers in the clock tree 204 to provide delays and generate skew, any other type of component or circuit element can be similarly used in addition to, in combination with, or in alternative to the buffers.

Figure 3:
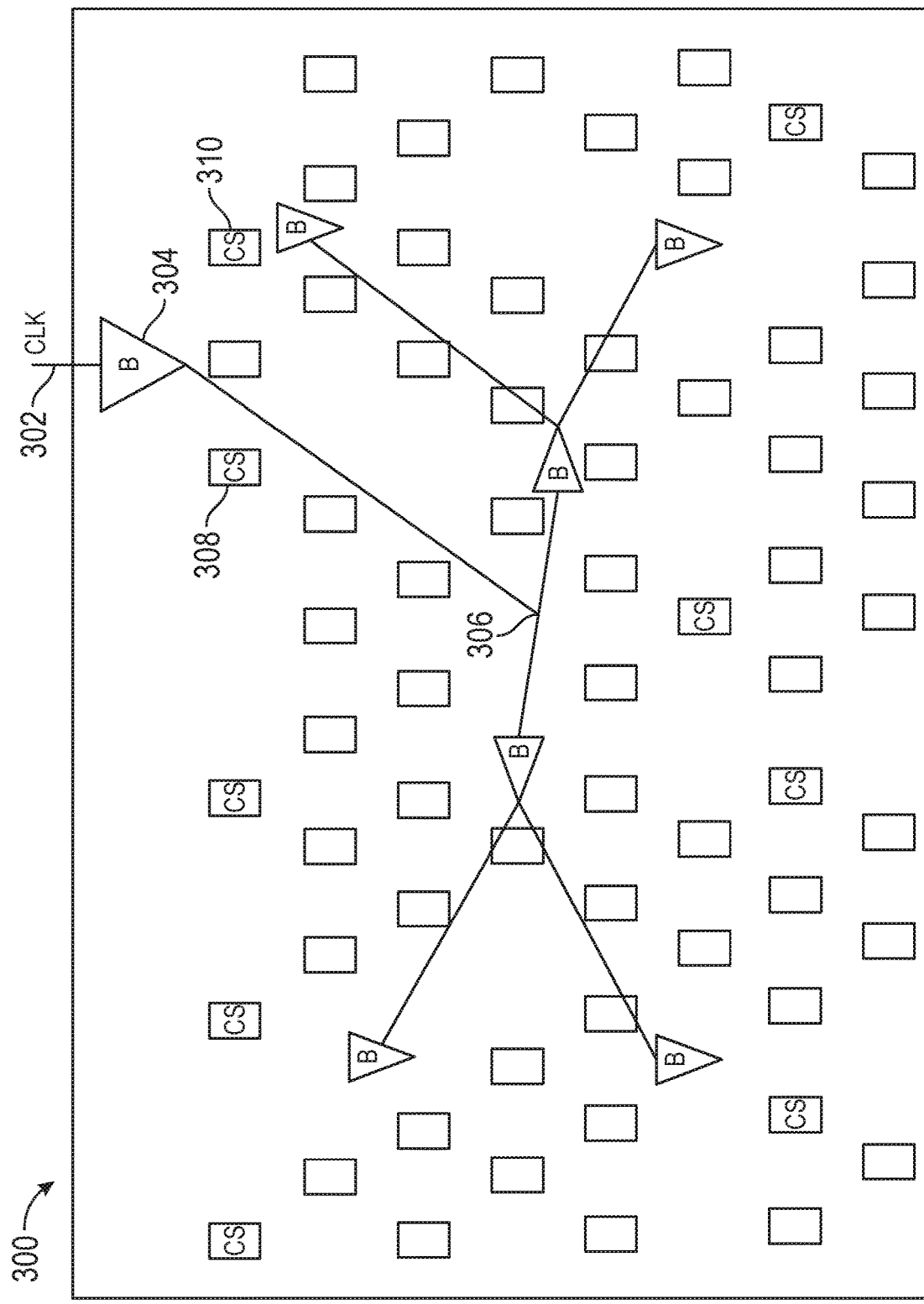
FIG. 3 is a plan view illustrating an example of a simplified clock tree to which post-CTS clock tree modifications may be applied, in accordance with some embodiments of the present disclosure.

FIG. 3 is a floorplan or plan view 300 of a simplified buffered clock tree of an IC to which post-CTS clock tree modifications may be applied in accordance with some embodiments of the present disclosure. The plan view 300 illustrates that an input clock signal CLK applied on a root node 302 of the clock tree is first routed from the root node 302 through a buffer 304 and toward a center 306 of the IC. The CLK signal is thereafter distributed outward from the center 306 to propagate the clock signal to clock sinks in the clock tree. This technique helps to better equalize the insertion delays ID of the clock sinks. If the CLK signal was to be routed directly from the root node 302 to clock sinks 308, 310, for example, the insertion delays ID of these two clock sinks 308, 310 could be much lower than the insertion delays of the remaining clock sinks in the clock. Large differences in insertion delays ID among clock sinks results in large skews SK among clock sinks in the clock tree, which is undesirable. Thus, as depicted in FIG. 3, the CLK signal is routed from the root node 302 and through the buffer 304 towards the center 306 of the IC, and from the center 306 the clock signal is then routed to additional buffers B arranged in respective regions of the IC. Each of these additional buffers B will provide a propagated clock signal to clock sinks proximate the buffer B in the corresponding region of the IC.

Returning now to FIG. 1, according to various embodiments the clock tree reformulation, restructuring or modification is performed as a part of the CTS operation 108. The CTS operation 108 includes placing clock or drivers in various regions of the IC design based on satisfaction of a set of clock tree design rules or constraints, which can include slew, insertion delay (e.g., latency), skew, and power consumption by the generated clock tree. Each clock driver delivers the clock signal to a set of clock sinks and/or a further clock driver or set of clock drivers. A clock net of the IC design describes conductive traces or routes between a clock driver and clock sinks as well as any further clock drivers to be driven by the clock driver. Any one of the clock sources, clock sinks, and clock drivers may be referred to generally herein as a "clock instance." Moreover, clock drivers will typically be referred to as buffers in the following description by way of example of one common type of clock driver.

The CTS operation 108 constructs an initial clock tree through a suitable technique, such as, for example, using the Steiner-tree approach. With the Steiner-tree approach, a minimum rectilinear Steiner tree (MRST) is used for routing a multi-pin clock net with minimum length for conductive traces or routes connecting to the clock sinks. Given m points in the plane, an MRST connects all points by rectilinear lines, possibly via some extra points (called Steiner points), to achieve a minimum-length tree of rectilinear edges. One skilled in the art will understand the utilization of the Steiner-tree approach to formulate an initial clock tree, and the Steiner-tree approach will not be described in detail in the present description. In addition, one skilled in the art will appreciate that the Steiner-tree approach is merely one example of an approach that may be used to construct an initial clock tree. In other embodiments, the CTS operation 108 may utilize one of several other known clock tree construction techniques to construct the conductive routes connecting to the clock sinks in the initial clock tree.

As will be discussed further detail below with reference to FIG. 4, the CTS operation 108 performs additional operations as part of the CTS to further refine the structure of the initial clock tree until a complete clock tree has been generated. Traditionally, the complete clock tree structure would correspond to the finalized clock tree structure and no further changes to the complete clock tree would be possible after generation through CTS. In embodiments of the present disclosure, the CTS operation 108 implements techniques for reducing the number of modifications to a post-CTS clock tree that are necessary for the post-CTS clock tree to satisfy specified insertion delay and skew parameters for the clock tree, as will be described in more detail below. More specifically, embodiments identify clock sinks in the post-CTS clock tree that may need to be adjusted or modified in a way that reduces the number of post-CTS modifications necessary for the clock tree to satisfy specified insertion delay and skew parameters for the clock tree.

In FIG. 1, after design inputs are used in the design input operation 104 to generate a circuit layout for the functional circuitry of the device being designed, and the routing and optimization operation 106 is performed, a layout is generated in the layout instance operation 110. The layout describes the physical layout dimensions of the device that match the design inputs. Prior to this layout being provided to a fabrication operation 114, the signoff operation 112 is performed on the circuit design defined by the layout.

After signoff verification by the signoff operation 112, a verified version of the layout is used in the fabrication operation 114 to generate a device, or additional testing and design updates may be performed using designer inputs or automated updates based on design simulation operations 116, or extraction, 3D modeling, and analysis operations 122. Once the device is generated, the device can be tested as part of device test operation 126, and layout modifications generated based on actual device performance.

A design update operation 118 from the design simulation operation 116, a design update operation 124 from the device test operation 126 or the extraction, 3D modeling, and analysis operations 122, or the design input operation 104 may occur after the initial layout instance operation 110 is performed. In various embodiments, whenever design inputs are used to update or change an aspect of a circuit design, a timing analysis and the routing and optimization operation 106 may be performed.

Figure 4:
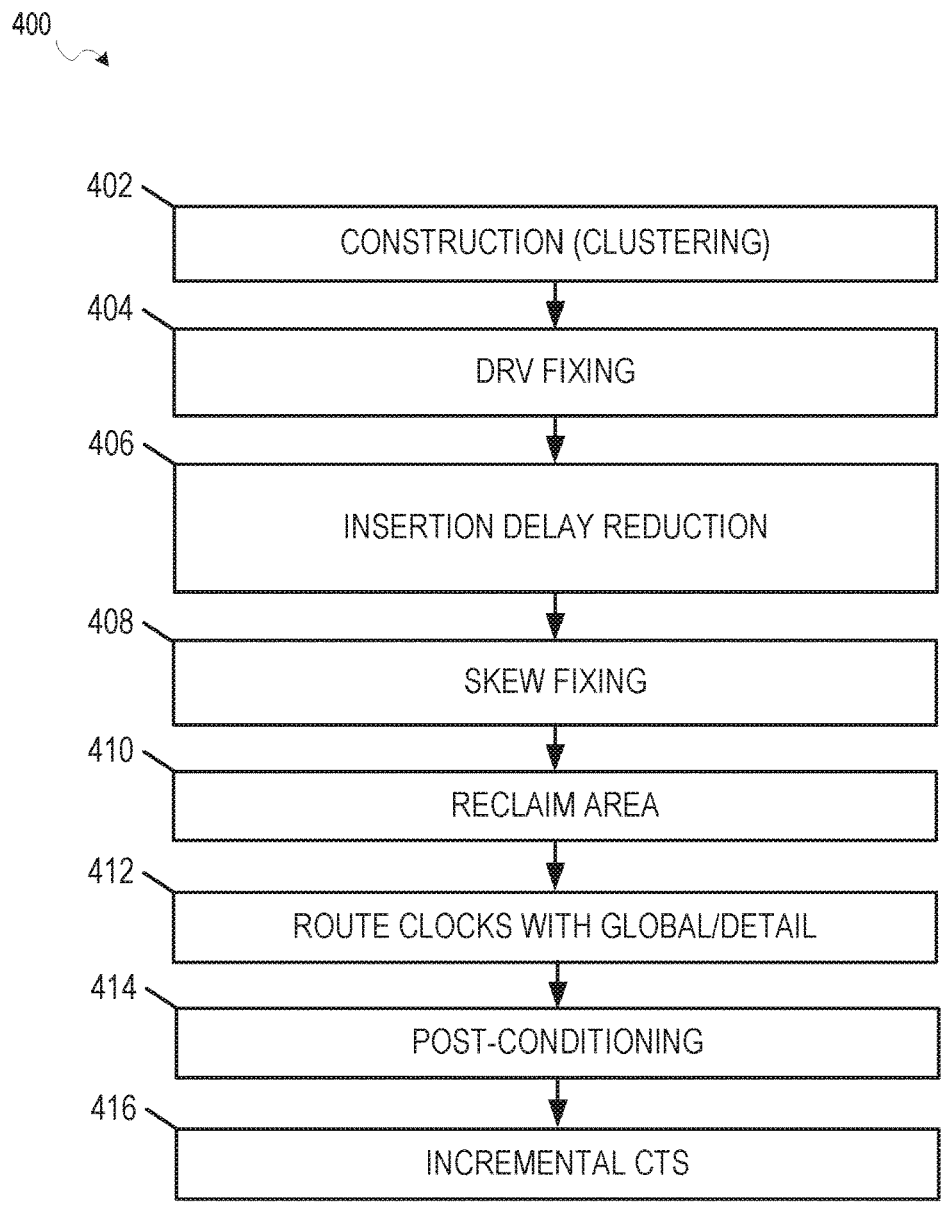
FIG. 4 is a flow diagram illustrating an example of CTS and applying post-CTS clock tree modifications to a synthesized clock tree, in accordance with some embodiments of the present disclosure.

FIG. 4 is a flow diagram illustrating in more detail a CTS process flow 400 which includes operations 402-414 for performing CTS to generate a complete clock tree, and further includes an incremental CTS operation 416 for implementing post-CTS modifications to the complete clock tree to generate a finalized clock tree, according to embodiments of the present disclosure. The operations 402-414 perform traditional operations in CTS and thus each of these operations will not be described in detail herein, with those skilled in the understanding the suitable techniques for performing each of these operations. The CTS process flow 400 starts the CTS in a construction (clustering) operation 402 in which clock sinks to be included in the clock tree are group or clustered based on some criteria, such as geometry-based K-means clustering or capacitance-based clustering. In the CTS process flow 400, the clustering operation 402 includes the formation of an initial clock tree through Steiner-routing or other suitable technique as described above with reference to the CTS operation 108 of FIG. 1.

The CTS process flow 400 further includes a design rule violation (DRV) operation 404 that fixes violations of design rules for the clock tree that are present in the initial clock tree. Design rules are geometric constraints applied to a physical layout of an IC being designed to ensure the designed circuit functions properly, as will be appreciated by those skilled in the art. Typical design rules relate to width of conductive traces or routes, spacing between adjacent conductive routes, along with many other design rules which must be followed to ensure proper functionality of the designed circuit. An insertion delay reduction operation 406 reduces insertion delays ID of clock sinks the clock tree, such as by repositioning clock sinks closer to the root node to reduce insertion delay or adding drivers, buffers or components to increase insertion delay. A skew fixing operation 408 fixes skew violations of propagated signals in the clock tree being synthesized, and an area reclamation operation 410 reduces the area occupied by the clock tree in the total layout area of the IC being designed.

A global and detailed routing operation 412 reroutes the initial conductive trace routing generated in the Steiner-tree routing performed by operation 402 with actual physically routing of conductive traces that may be used to connect to the clock sinks. For example, in the global routing portion of operation 412 the conductive routes generated through the Steiner-tree routing are physically positioned so that the conductive routes do not short circuit with one another. The detailed routing portion of operation 412 fine-tunes the clock tree being synthesized, eliminating any design rule violations arising from the global routing and ensuring that the clock tree is physically synthesizable for the IC being designed. The fine-tuning of the clock tree in the detailed routing portion of operation 412 may result in violations of required operating parameters of the clock tree. For example, repositioning of selected conductive routes during detailed routing may change the capacitance of some of these conductive routes, and this change in capacitance may result in transition time or slew violations for the propagated clock signal on these conductive routes. A post-conditioning operation 414 fixes slew violations that arise as a result of the detailed routing portion of the operation 412.

The CTS process flow 400 concludes with an incremental CTS operation 416 in which post-CTS modifications are performed on the synthesized clock tree generated after the post-conditioning operation 414 according to embodiments of the present disclosure. As mentioned above, traditionally no further changes to the synthesized clock tree that is generated after the post-conditioning operation 414 were possible without again performing clock synthesis. Moreover, performing clock tree synthesis on an EDA software system is a time-consuming process, typically taking hours to rerun or have the system again perform clock tree synthesis to modify the generated clock tree. In operation of the CTS process flow 400, the incremental CTS operation 416 provides, without once again performing clock tree synthesis and without requiring designer input, an automatic restructuring or modifying of a post-CTS clock tree to eliminate violations of specified insertion delay ID and skew parameters for the post-CTS clock tree. The incremental CTS operation 416 also reduces the number of post-CTS physical modifications to the synthesized clock tree, which is desirable as previously discussed. This makes it more likely the incremental CTS operation 416 is able to generate a finalized clock tree satisfying all required parameters for the clock tree and enabling implementation of the modified clock tree in the IC being designed.

Figure 5:
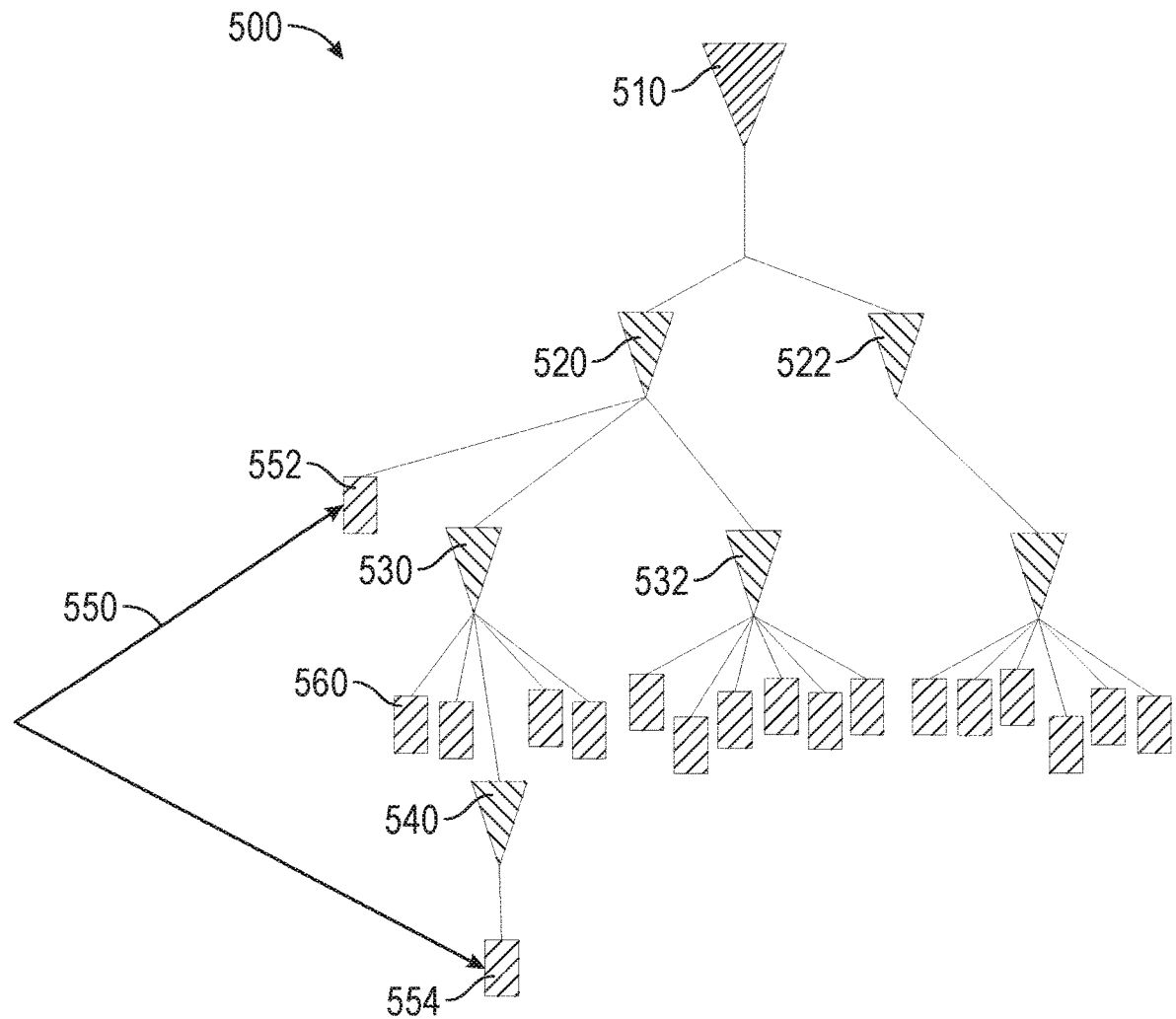
FIG. 5 illustrates an example of physical modifications to a post-CTS clock tree and shows difficulties that can arise in making physical modifications to clock sinks in the clock tree.

FIG. 5 illustrates an example of physical modifications to a post-CTS clock tree 500 and difficulties that can arise in making such physical modifications. A plurality of clock sinks 560 is shown along with a skew target SKT for the clock sinks. A source clock signal is represented by the root node 510 which passes through a first level of delay components 520 and 522 (e.g., buffers). The source clock after passing through the first level of delay components 520 and 522, passes through a second level of delay components 530 and 532. The clock signal, after being delayed by the first level of delay components 520 and 522 and the second level of delay components 530 and 532 is received by one or more of the plurality of clock sinks 560 as a skewed clock signal. Each of the plurality of clock sinks 560 can be associated with a relative same skew target, and minor variations of the individual skew targets of each of the plurality of clock sinks 560 can be performed by modifying a path routing distance (e.g., a size of a wire length) between a given one of the plurality of clock sinks 560 and the component 530 from which the delayed clock signal is received.

In some cases, there may exist a set of clock sinks 550 that need to receive an insertion delay adjustment that is beyond a threshold insertion delay adjustment of the plurality of clock sinks 560. For example, a clock sink 554 may be identified for which the skew target is far greater (larger than a specified threshold skew) than the skew targets of each of the plurality of clock sinks 560. In order to meet the skew target of the clock sink 554, additional delay may be added to the clock signal that is output by the second level of delay components 530 and 532. One typical way to add such a delay is by connecting an additional component 540 between the clock sink 554 and the delay components 530. However, adding the additional component 540 may introduce complexities in design and cost that fail to satisfy the constraints of the system. Another way to introduce the needed delay is by placing the clock sink 554 at a sufficient distance away from the delay components 530 that would introduce the target amount of additional delay to the clock needed by the clock sink 554. Such an approach is more prone to environmental changes impacting the target skew that is achieved and is also not optimal. Also, there may not be sufficient physical real estate to distance the clock sink 554 away from the delay components 530 to achieve the needed target skew.

As another example, a clock sink 552 may be identified for which the skew target is far lower (smaller than a specified threshold skew) than the skew targets of each of the plurality of clock sinks 560. In order to meet the skew target of the clock sink 552, delay may be reduced from the clock signal that is output by the second level of delay components 530 and 532. One typical way to reduce such a delay is by connecting the clock sink 552 directly to the delay components 520 of the first level. However, routing the output of the delay components 520 to an individual clock sink 552 may introduce complexities in design and cost that fail to satisfy the constraints of the system. Another way to reduce the needed delay is by placing the clock sink 552 at a sufficient distance closer to the delay components 530 or delay components 520 that would reduce the target amount of delay. Such an approach is more prone to environmental changes impacting the target skew that is achieved and is also not optimal.

Figure 6:
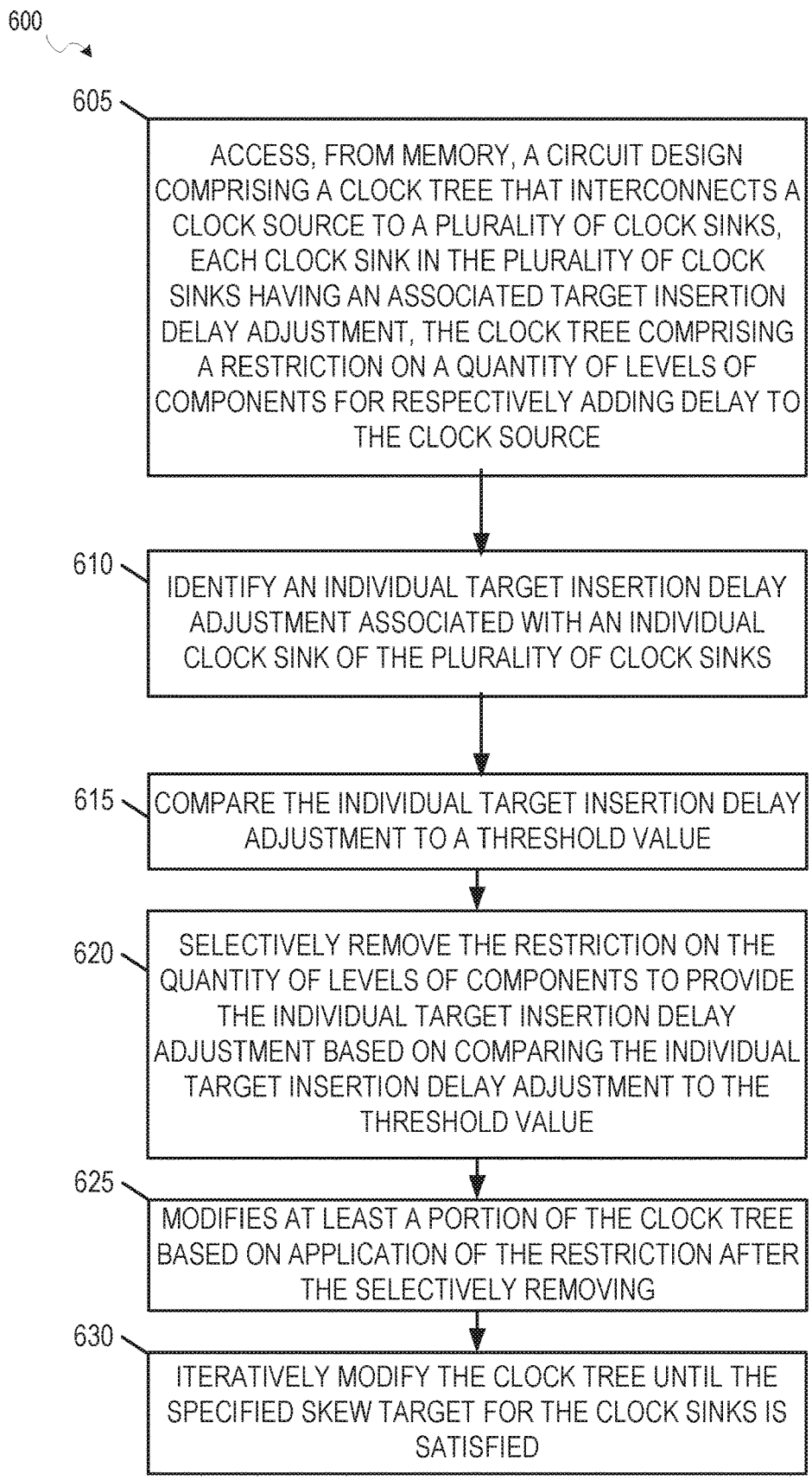
FIG. 6 illustrates an example process for modifying a post-CTS clock tree, in accordance with some embodiments of the present disclosure.

FIG. 6 illustrates a process 600 for reformulating or modifying a post-CTS clock tree according to some embodiments of the present disclosure. The process 600 begins with operation 602 in which a circuit design (e.g., integrated circuit design) stored in memory is accessed. This circuit design includes a synthesized clock tree that has been generated through CTS, as described above with reference to FIG. 4. After accessing the post-CTS clock tree in operation 605, a circuit design that includes a clock tree that interconnects a clock source to a plurality of clock sinks is accessed. Each clock sink in the plurality of clock sinks has an associated target insertion delay adjustment and the clock tree can include a restriction on a quantity of levels of components for respectively adding delay to the clock source. Then, at operation 610, an individual target insertion delay adjustment associated with an individual clock sink of the plurality of clock sinks is identified and, at operation 615, is compared to a threshold value. The system, at operation 620, selectively removes the restriction on the quantity of levels of components to provide the individual target insertion delay adjustment based on comparing the individual target insertion delay adjustment to the threshold value and, at operation 625, modifies at least a portion of the clock tree based on application of the restriction after the selectively removing. The process 600 may be executed multiple times on a post-CTS clock tree at operation 630 to iteratively modify the clock tree until the specified skew target SKT for the clock sinks is satisfied.

Figure 7:
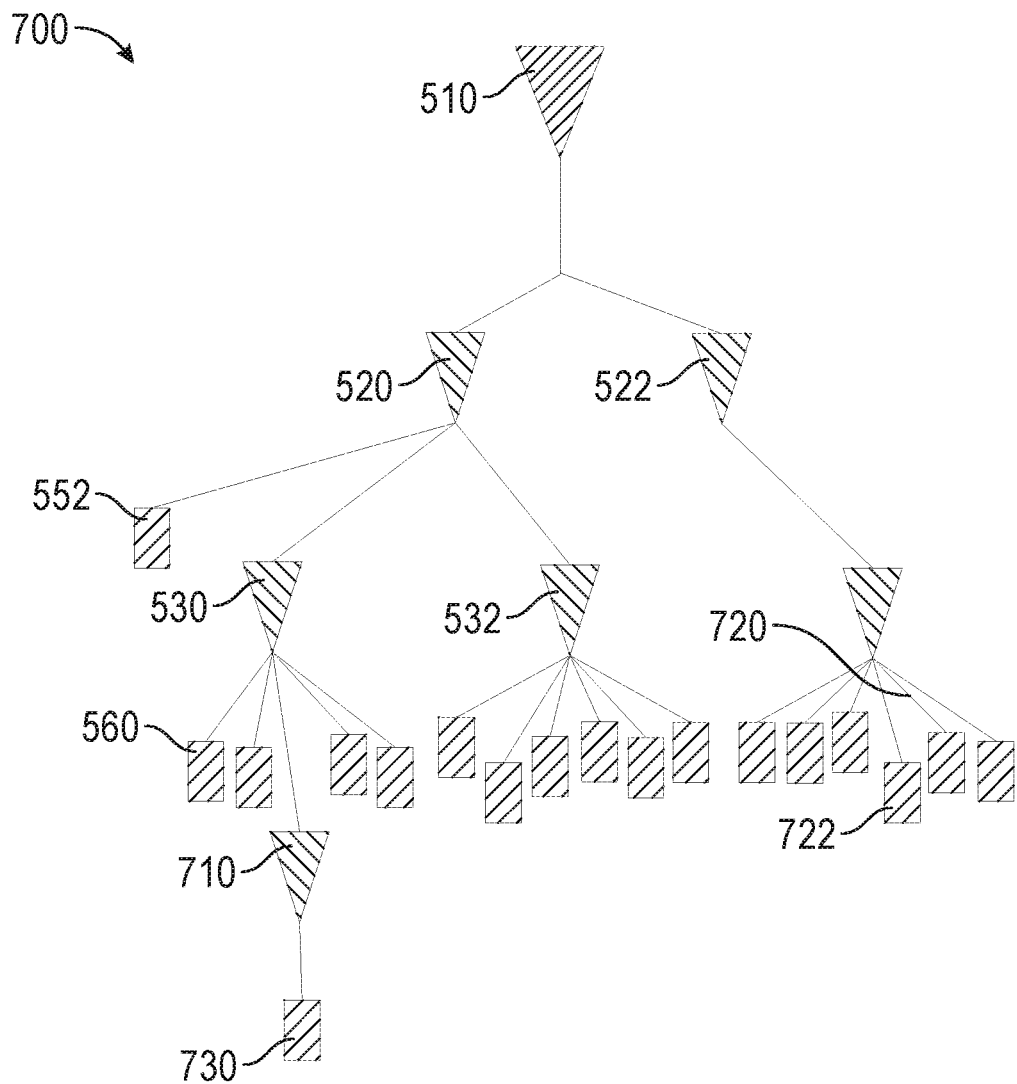
FIG. 7 illustrates an example of using the process of FIG. 6 in performing post-CTS modification of the clock tree, in accordance with some embodiments of the present disclosure.

FIG. 7 illustrates an example of physical modifications to a post-CTS clock tree 700, according to some embodiments. Certain aspects of the post-CTS clock tree 700 correspond to and are similar to the post-CTS clock tree 500 (FIG. 5) and so are similarly labeled. A plurality of clock sinks 560 is shown along with a skew target SKT for the clock sinks. A source clock signal is represented by the root node 510 which passes through a first level of delay components 520 and 522 (e.g., buffers). The source clock after passing through the first level of delay components 520 and 522, passes through a second level of delay components 530 and 532. The clock signal after being delayed by the first level of delay components 520 and 522 and the second level of delay components 530 and 532, is received by one or more of the plurality of clock sinks 560 as a skewed clock signal.

Each of the plurality of clock sinks 560 can be associated with a relative same skew target and minor variations of the individual skew targets of each of the plurality of clock sinks 560 can be performed by modifying a path routing distance (e.g., a size of a wire length) between a given one of the plurality of clock sinks 560 and the component 530 from which the delayed clock signal is received.

As mentioned above, adding more levels to the post-CTS clock tree 700 to match a target skew for a given clock sink can introduce various complexities, fail to meet design constraints, adds cost, and is inefficient from a power perspective. As such, the post-CTS clock tree 700 can limit or place a restriction on the total quantity or number of levels that can be added to provide skew for the clock sinks 560. For example, the post-CTS clock tree 700 can be restricted to having only two levels (e.g., a first level with delay components 520 and delay components 522 and a second level with delay components 530 and delay components 532). This can be an issue if a particular clock sink 730 is associated with a target skew that exceeds that of the target skews of the clock sinks 560. The only way to add the needed skew when the total quantity of levels is restricted is to adjust a size of existing components 520, 522, 530, and/or 532 and/or place the particular clock sink 730 at a particular distance away from the last level in the clock tree 700 so that the wire length sufficiently adds delay to meet the target skew. The disclosed embodiments add flexibility to providing a clock signal that meets the target skew by relaxing the restriction on the quantity of levels of the post-CTS clock tree 700 under certain circumstances.

In some examples, the disclosed embodiments allow one or more levels to be added only for the particular clock sink 730 if the target skew of the particular clock sink 730 transgresses a minimum threshold. For example, the disclosed embodiments access a target skew of the particular clock sink 730 and compare the target skew to a skew threshold. The target skew that is accessed can be in terms of total clock signal delay starting from root node 510 and going through each of the levels of the post-CTS clock tree 700 until the clock sinks 560. A difference between the target skew of the particular clock sink 730 and the delayed clock signal output by the delay components 530 can be computed and compared to the skew threshold. For example, if the difference transgresses the threshold (e.g., is greater than 10 picoseconds or is between 5-15 picoseconds), then the disclosed embodiments allow one more level including a component 710 (e.g., a buffer) to be added to provide the additional clock delay corresponding to the difference. The component 710 can receive the delayed clock signal output by one of the delay components 530 of the second level and can provide that delayed clock signal to the particular clock sink 730.

In some examples, multiple thresholds can be used and associated with respective quantities of additional levels that can be added to the post-CTS clock tree 700 for which the quantity of levels is restricted. For example, if the difference transgresses another threshold (e.g., is greater than a first threshold of 10 picoseconds that allows one level to be added and is greater than 15 picoseconds of a second threshold that allows two levels to be added), then the disclosed embodiments allow multiple (e.g., 2 or more) levels including multiple components (e.g., multiple cascaded buffers) to be added to provide the additional clock delay corresponding to the difference only for that particular clock sink 730. The multiple components that are cascaded can receive the delayed clock signal output by one of the delay components 530 of the second level (e.g., the clock signal that is output by a last level in the post-CTS clock tree 700) and can provide that delayed clock signal to the particular clock sink 730.

In some cases, the difference between the target skew of an individual clock sink 722 and the delayed clock signal output by the delay components of the second level (e.g., delay components 532) can be computed and compared to the skew threshold. The difference can be determined to be less than the threshold (fails to transgress the threshold). In response, the disclosed embodiments prevent adding another level to the post-CTS clock tree 700. In such cases, the disclosed embodiments place the individual clock sink 722 at a distance away from the delay components of the second level to provide sufficient amount of delay in the wire 720 that routes the signal from the delay components of the second level to the individual clock sink 722. Alternatively, or in addition, the disclosed embodiments can modify an attribute (e.g., increase or decrease a size) of the second level of delay components) to provide the sufficient delay to meet the target skew of the individual clock sink 722.

Figure 8:
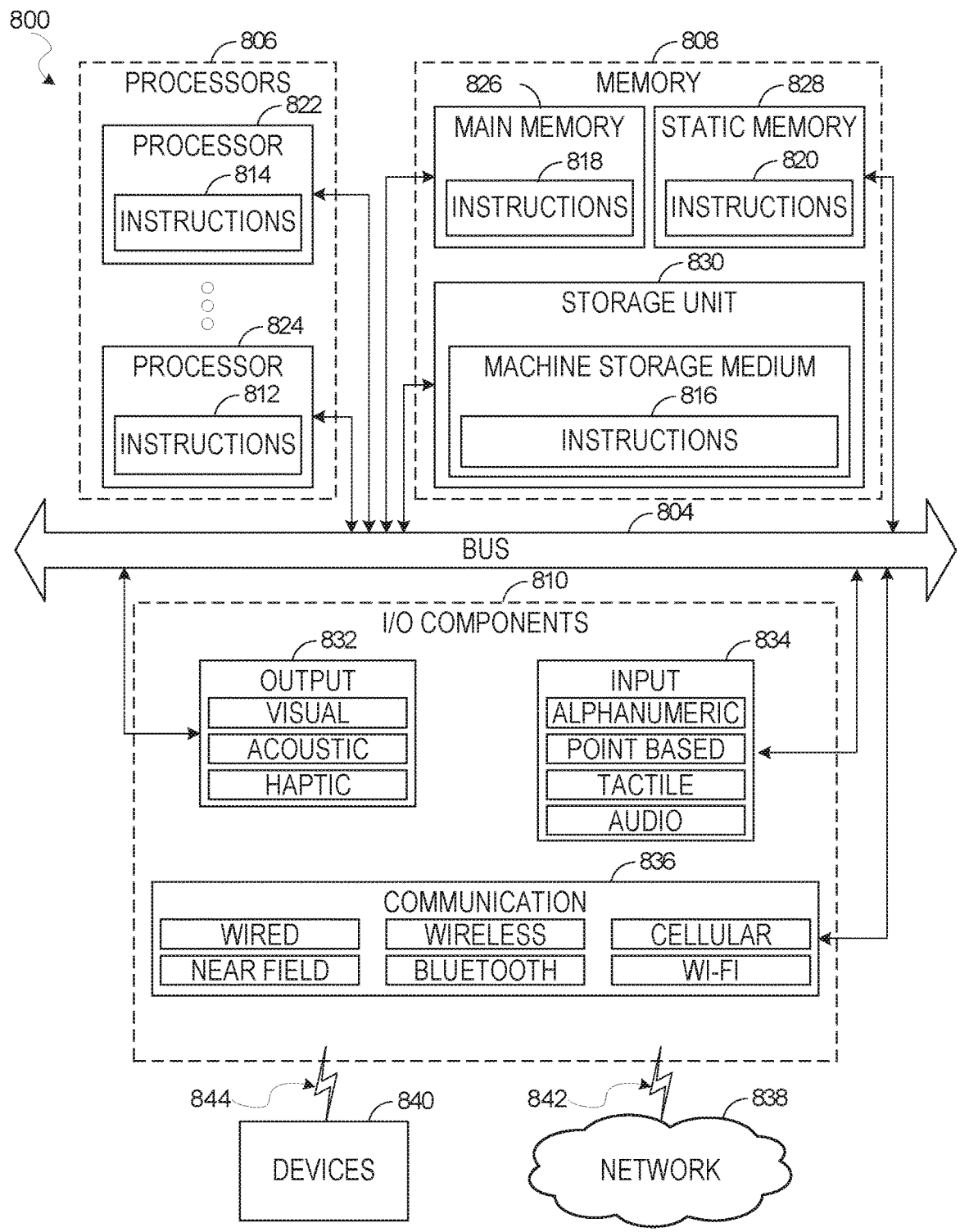
FIG. 8 is a functional block diagram of an example computing system for carrying out methods and operations described herein, in accordance with some embodiments of the present disclosure.

FIG. 8 is a functional block diagram of a computing system 800 for executing process 600 and other processes described above, along with other embodiments of the present disclosure. The computing system 800 may execute an EDA software system and for performing the process 600, and other processes described above, in accordance with some embodiments of the present disclosure. A machine 802 is shown in the form of a computer system within which a set of instructions may be executed for causing the machine to perform any one or more of the process 600 and other methodologies discussed herein, according to some embodiments. Specifically, FIG. 8 shows a diagrammatic representation of the machine in the example form of a computing system 800. The computing system 800 may include a bus 804, processors 806, memory 808, and I/O components 810, which may be configured to communicate with each other such as via the bus 804. The machine may include instructions 812-820 (e.g., software, a program, an application, an applet, an app, or other executable code) for causing the machine to perform any one or more of the methodologies discussed herein may be executed. For example, the instructions 812-820 may cause the machine to execute an EDA software system that executes the processes described in the above description. The instructions 812-820 transform the general, non-programmed machine into a particular machine programmed to carry out the described and illustrated functions in the manner described here. In alternative embodiments, the machine operates as a standalone device or may be coupled (e.g., networked) to other machines. In a networked deployment, the machine may operate in the capacity of a server machine or a client machine in a server-client network environment, or as a peer machine in a peer-to-peer (or distributed) network environment. The machine may comprise, but not be limited to, a server computer, a client computer, a personal computer (PC), a tablet computer, a laptop computer, a netbook, a smart phone, a mobile device, a), a network router, a network switch, a network bridge, or any machine capable of executing the instructions 812-820, sequentially or otherwise, that specify actions to be taken by the machine. Further, while only a single machine is illustrated, the term "machine" shall also be taken to include a collection of machines that individually or jointly execute the instructions 812-820 to perform any one or more of the methodologies discussed herein.

In an example embodiment, the processors 806 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 822 and a processor 824 that may execute the instructions 814, 812. The term "processor" is intended to include multi-core processors 806 that may comprise two or more independent processors (sometimes referred to as "cores") that may execute instructions contemporaneously. Although FIG. 8 shows multiple processors 806, the machine may include a single processor with a single core, a single processor with multiple cores (e.g., a multi-core processor), multiple processors with a single core, multiple processors with multiple cores, or any combination thereof.

The memory 808 may include a main memory 826, a static memory 828, and a storage unit 830, both accessible to the processors 806 such as via the bus 804. The main memory 826, the static memory 828, and the storage unit 830 store the instructions 816-820 embodying any one or more of the processes, methodologies or functions described herein. The instructions 812-820 may also reside, completely or partially, within the main memory 826, within the static memory 828, within the storage unit 820, within at least one of the processors 806 (e.g., within the processor's cache memory), or any suitable combination thereof, during execution thereof by the machine.

The I/O components 810 may include a wide variety of components to receive input, provide output, produce output, transmit information, exchange information, capture measurements, and so on. The specific I/O components 810 that are included in a particular machine will depend on the type of machine. For example, portable machines such as mobile phones will likely include a touch input device or other such input mechanisms, while a headless server machine will likely not include such a touch input device. It will be appreciated that the I/O components 810 may include many other components that are not shown in FIG. 8. The I/O components 810 are grouped according to functionality merely for simplifying the following discussion and the grouping is in no way limiting. In various example embodiments, the I/O components 810 may include output components 832 and input components 834. The output components 832 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 834 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 810 may include communication components 836 operable to couple the machine to a network 838 or devices 840 via a coupling 842 and a coupling 844, respectively. For example, the communication components 836 may include a network interface component or another suitable device to interface with the network 838. In further examples, the communication components 836 may include wired communication components, wireless communication components, cellular communication components, and other communication components to provide communication via other modalities. The devices 840 may be another machine or any of a wide variety of peripheral devices (e.g., a peripheral device coupled via a universal serial bus (USB)).

Executable Instructions and Machine Storage Medium

The various memories (e.g., 808, 818, 820 and/or memory of the processor(s) 806, 822, 824) and/or the storage unit 830 may store one or more sets of instructions and data structures (e.g., software) embodying or utilized by any one or more of the methodologies or functions described herein. These instructions, when executed by the processor(s) 806, cause various operations to implement the disclosed embodiments.

As used herein, the terms "machine-storage medium," "device-storage medium," and "non-transitory computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 838 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 838 or a portion of the network 838 may include a wireless or cellular network, and the coupling 842 may be a Code Division Multiple Access (CDMA) connection, a Global System for Mobile communications (GSM) connection, or another type of cellular or wireless coupling. In this example, the coupling 842 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 812-820 may be transmitted or received over the network 938 using a transmission medium via a network interface device (e.g., a network interface component included in the communication components 836) and utilizing any one of a number of well-known transfer protocols (e.g., hypertext transfer protocol (HTTP)). Similarly, the instructions 812-820 may be transmitted or received using a transmission medium via the coupling 844 (e.g., a peer-to-peer coupling) to the devices 840. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 812-820 for execution by the machine 802, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media (non-transitory computer readable media or medium) and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:
   accessing, from memory, a circuit design comprising a clock tree that interconnects a clock source to a plurality of clock sinks, each clock sink in the plurality of clock sinks having an associated target insertion delay adjustment, the clock tree being generated based on application of a restriction on a quantity of levels of components in the clock tree for respectively adding delay to the clock source;
   identifying an individual target insertion delay adjustment associated with an individual clock sink of the plurality of clock sinks;
   comparing the individual target insertion delay adjustment to a threshold value;
   selectively removing application of the restriction on the quantity of levels of components to provide the individual target insertion delay adjustment based on comparing the individual target insertion delay adjustment to the threshold value; and
   modifying at least a portion of the clock tree based on application of the restriction after the selectively removing.

2. The method of claim 1, further comprising:
   determining that the individual target insertion delay adjustment transgresses the threshold value; and
   in response to determining that the individual target insertion delay adjustment transgresses the threshold value, modifying the clock tree by adding one or more levels to the clock tree to provide a path from the clock source to the individual clock sink that includes a greater quantity of levels of components than the quantity of levels associated with the restriction.

3. The method of claim 2, wherein the individual target insertion delay adjustment is a first insertion delay adjustment, and wherein the individual clock sink is a first clock sink, further comprising as a result of the modifying:
   generating the first insertion delay adjustment by routing the clock source to the first clock sink through a first quantity of components; and
   generating a second insertion delay adjustment for a second clock sink of the plurality of clock sinks by routing the clock source to the second clock sink through a second quantity of components, the second quantity of components being fewer than the first quantity of components.

4. The method of claim 2, wherein the threshold value comprises ten or more picoseconds.

5. The method of claim 2, wherein the threshold value comprises a range between 5 picoseconds and 15 picoseconds.

6. The method of claim 2, wherein the threshold value is a first threshold value, further comprising:
   determining that the individual target insertion delay adjustment transgresses a second threshold value that is greater than the first threshold value; and
   in response to determining that the individual target insertion delay adjustment transgresses the second threshold value, modifying the clock tree by adding more than one level to the clock tree to provide the path from the clock source to the individual clock sink.

7. The method of claim 2, further comprising:
   determining a maximum quantity of levels that can be added as the one or more levels.

8. The method of claim 1, further comprising:
   determining that the individual target insertion delay adjustment fails to transgress the threshold value; and
   in response to determining that the individual target insertion delay adjustment fails to transgress the threshold value, modifying the clock tree by preventing adding one or more levels to the clock tree.

9. The method of claim 8, the modifying further comprising:
   generating the individual target insertion delay adjustment by increasing a path length of a path from the clock source to the individual clock sink through the quantity of levels of components without modifying the quantity of levels.

10. The method of claim 8, the modifying further comprising:
    generating the individual target insertion delay adjustment by modifying a cell size of one or more components in the clock tree.

11. A non-transitory computer readable medium comprising instructions, that when executed by a processor, configure the processor to perform operations comprising:
    accessing, from memory, a circuit design comprising a clock tree that interconnects a clock source to a plurality of clock sinks, each clock sink in the plurality of clock sinks having an associated target insertion delay adjustment, the clock tree comprising a restriction on a quantity of levels of components for respectively adding delay to the clock source;
    identifying an individual target insertion delay adjustment associated with an individual clock sink of the plurality of clock sinks;
    comparing the individual target insertion delay adjustment to a threshold value;
    selectively removing the restriction on the quantity of levels of components to provide the individual target insertion delay adjustment based on comparing the individual target insertion delay adjustment to the threshold value; and modifying at least a portion of the clock tree based on application of the restriction after the selectively removing.

12. The non-transitory computer readable medium of claim 11, the operations further comprising:

determining that the individual target insertion delay adjustment transgresses the threshold value; and in response to determining that the individual target insertion delay adjustment transgresses the threshold value, adding one or more levels to the clock tree to provide a path from the clock source to the individual clock sink that includes a greater quantity of levels of components than the quantity of levels associated with the restriction.

13. The non-transitory computer readable medium of claim 12, wherein the individual target insertion delay adjustment is a first insertion delay adjustment, and wherein the individual clock sink is a first clock sink, the operations further comprising:

generating the first insertion delay adjustment by routing the clock source to the first clock sink through a first quantity of components; and generating a second insertion delay adjustment for a second clock sink of the plurality of clock sinks by routing the clock source to the second clock sink through a second quantity of components, the second quantity of components being fewer than the first quantity of components.

14. The non-transitory computer readable medium of claim 12, wherein the threshold value comprises ten or more picoseconds.

15. The non-transitory computer readable medium of claim 12, wherein the threshold value comprises a range between 5 picoseconds and 15 picoseconds.

16. The non-transitory computer readable medium of claim 12, wherein the threshold value is a first threshold value, the operations further comprising:

determining that the individual target insertion delay adjustment transgresses a second threshold value that is greater than the first threshold value; and in response to determining that the individual insertion delay adjustment delay transgresses the second threshold value, adding more than one level to the clock tree to provide the path from the clock source to the individual clock sink.

17. The non-transitory computer readable medium of claim 12, further comprising:

determining a maximum quantity of levels that can be added as the one or more levels.

18. The non-transitory computer readable medium of claim 11, the operations further comprising:

determining that the individual target insertion delay adjustment fails to transgress the threshold value; and in response to determining that the individual target insertion delay adjustment fails to transgress the threshold value, preventing adding one or more levels to the clock tree.

19. The non-transitory computer readable medium of claim 18, the operations further comprising:

generating the individual target insertion delay adjustment by increasing a path length of a path from the clock source to the individual clock sink through the quantity of levels of components without modifying the quantity of levels.

20. A system comprising:

one or more processors; and a memory storing instructions that, when executed by the one or more processors, cause the system to perform operations comprising:

accessing, from memory, a circuit design comprising a clock tree that interconnects a clock source to a plurality of clock sinks, each clock sink in the plurality of clock sinks having an associated target insertion delay adjustment, the clock tree comprising a restriction on a quantity of levels of components for respectively adding delay to the clock source;

identifying an individual target insertion delay adjustment associated with an individual clock sink of the plurality of clock sinks;

comparing the individual target insertion delay adjustment to a threshold value;

selectively removing the restriction on the quantity of levels of components to provide the individual target insertion delay adjustment based on comparing the individual target insertion delay adjustment to the threshold value; and modifying at least a portion of the clock tree based on application of the restriction after the selectively removing.

* * * * *